United States Patent [19]

Ungermann et al.

[11] Patent Number: 4,808,935
[45] Date of Patent: Feb. 28, 1989

[54] ELECTRIC SET-POINT TRANSMITTER

[75] Inventors: Heinz Ungermann, Linsengericht; Wolfgang Sauerschell, Oberursel; Wilfried Heumann, Neu-Anspach, all of Fed. Rep. of Germany

[73] Assignee: VDO Adolf Schindling AG, Frankfurt am Main, Fed. Rep. of Germany

[21] Appl. No.: 924,095

[22] Filed: Oct. 28, 1986

[30] Foreign Application Priority Data

Oct. 28, 1985 [DE] Fed. Rep. of Germany ....... 3538232

[51] Int. Cl.$^4$ ........................... H03K 5/22; H02G 3/00
[52] U.S. Cl. ........................................ 328/146; 328/1; 307/10 R; 307/308; 307/494
[58] Field of Search ................. 328/1; 307/10 R, 308, 307/494; 338/68; 123/399, 361, 564, 370; 340/870.38; 318/319

[56] References Cited

U.S. PATENT DOCUMENTS

| | | | |
|---|---|---|---|
| 3,886,818 | 6/1975 | Wurst | 74/851 |
| 4,020,455 | 4/1977 | Irimajiri et al. | 307/10 R |
| 4,211,961 | 7/1980 | Marumoto et al. | 318/139 |
| 4,506,642 | 3/1985 | Plalzgraf et al. | 123/399 |
| 4,508,090 | 4/1985 | Rembold | 123/564 |
| 4,519,360 | 5/1985 | Murakami | 123/399 |

Primary Examiner—Stanley D. Miller
Assistant Examiner—Trong Quang Phan
Attorney, Agent, or Firm—Martin A. Farber

[57] ABSTRACT

In an electric set-point transmitter for automotive vehicles, particularly for gas-pedal systems, having an actuating element and a resistance element which is connected to the actuating element, there is provided within the electric set-point transmitter which forms a structural unit, an electric circuit which comprises an impedance transformer and possibly a stabilization circuit and threshold switch. The resistance element is preferably a conductive-plastic potentiometer, whereby good reliability and the possibility of use at high temperatures are obtained.

6 Claims, 3 Drawing Sheets

ELECTRIC SET-POINT TRANSMITTER

FIELD AND BACKGROUND OF THE INVENTION

The present invention concerns an electric set-point transmitter for automotive vehicles, particularly as gas-pedal system, having an actuating element and a resistance element which is connected to the actuating element, an electric voltage which indicates the position of the actuating element being obtainable at one output of the electric set-point transmitter.

In electric set-point transmitters for automotive vehicles, particularly for gas-pedal systems, extremely high dependability is required. In known set-point transmitters of this type, potentiometers in which a wiper contact wipes over an electric resistance path are used, to be sure, to convert the mechnical position into an electric voltage. However, they have various disadvantages; in particularly, a reliable contact between the wiper contact and the resistance path is not always assured.

There are, to be sure, conductive-plastic potentiometers which are extremely reliable and can be used at the high temperatures which occur in automobiles, especially near the engine. These conductive-plastic potentiometers, however, have the disadvantage that the contact between wiper and resistance path can be subjected only to very small currents.

High-ohmic lines, however, lead to disturbances, particularly in an automotive vehicle. Thus, for instance, leakage paths produced by moisture as well as electrical and magnetic influences are substantially more noticeable than in the case of low-ohmic lines. Furthermore, contacts of plug connections and switches tend more frequently to error when their current load is extremely small.

SUMMARY OF THE INVENTION

It is an object of the present invention, therefore, to provide an electric set-point transmitter for automotive vehicles, particularly for gas-pedal systems, which assures reliable operation at the least possible technical expense.

According to the invention, within the set-point transmitter which forms a structural unit, there is provided an electric circuit (2) which comprises an impedance transformer (15) whose ouptut forms the output (17) of the electric set-point transmitter.

By this development of the electric set-point transmitter in accordance with the invention extreme reliability of the set-point transmitter itself is assured. Furthermore, the prerequisite is created for the reduction of the possibilities of error on the part of the assemblies connected with the electrical set-point transmitter, particularly the lines and plugs.

Particularly high reliability is obtained by the use of conductive-plastic potentiometers (13) for the resistance element.

Further, the actuating element can be a gas pedal.

In further embodiments of the invention, the electric circuit can also contain a component (46) for avoiding disturbances in case of incorrect polarity of the operating current fed (reverse-polarity protection) as well as a circuit for the stabilizing (16) of the operating voltage fed.

In this way, high reliability in assembly and maintenance work is obtained, on the one hand, while, on the other hand, there is obtained greater freedom from disturbing noise of the electric signal which is given off.

Another embodiment consists in the provision of one or more electronic threshold switches (27, 28, 29; 41, 42) whose output signals pass from one level into another level as the actuating element passes above or below a predetermined position. In known set-point transmitters, switches are mainly in addition provided which are actuated whenever the actuating element is at predetermined positions. Thus, for example, in the case of a gas pedal, a switch is actuated when the gas pedal is brought out of the idle position. Another switch is provided in some cases to characterize the full-gas ("kick down") position. By means of this last-mentioned further development of the invention, these mechanial switches can be replaced or possibly supplemented, whereby greater reliability and/or lower technical expense can be obtained.

BRIEF DESCRIPTION OF THE DRAWINGS

With the above and other objects and advantages in view, the present invention will become more clearly understood in connection with the detailed description of preferred embodiments, when considered with the accompanying drawings, of which.

In the figures the same parts bear the same reference numbers.

DETAILED DESCRIPTION OF THE PREFERRED EMBODIMENTS

Figure 1:
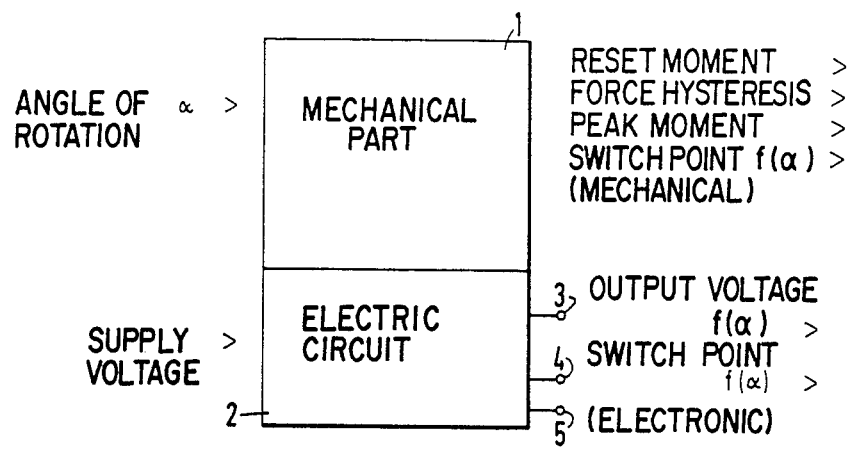
FIG. 1 is an embodiment shown very diagrammatically.

In FIG. 1, the mechanical part 1 of an electric set-point transmitter according to the invention and the corresponding electric circuit 2 are shown diagrammatically in the form of function blocks. Via a rod system, the position of the gas pedal (neither of them shown in the drawing) is fed to the mechanical part 1 as an angle of rotation alpha. The reset moment, a force hysteresis and a peak moment are fed back to the gas pedal as output values of the mechanical part 1.

As output value which is fed directly, i.e. without the interposition of the electronic system 2, to other components of the automotive vehicle, there is a signal which is produced by switches which are dependent on the angle of rotation. In particular, a signal which characterizes the idle position can be produced preferably in the manner described so that additional assurance is had against an undesired giving of gas possibly caused by errors in the electronic system.

A supply voltage, preferably the voltage of the car electrical system, is fed to the electric circuit 2. The mechanical part 1 acts on a conductive-plastic potentiometer. The electric variable thus obtained, which is analogous to the position of the gas pedal, is fed in the electric circuit 2 to an impedance transformer and is available at the output 3 for transmission to other structural groups in the automotive vehicle, for example to an electronic controller.

In accordance with a further development of the invention, the electric circuit 2 contains threshold value switches at the outputs of which there are switch signals which characterize predetermined positions of the gas pedal. Two of these outputs 4, 5 are shown in FIG. 1.

Figure 2:
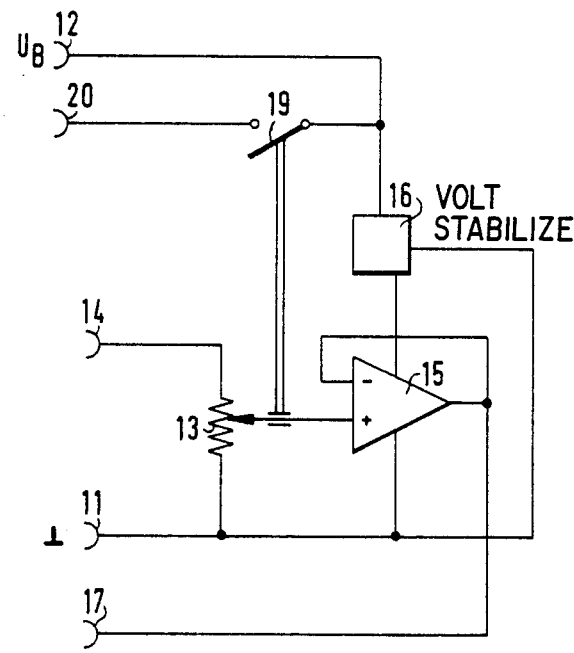
FIGS. 2 to 6 show embodiments of circuit arrangements in detail.

The circuit shown in FIG. 2 represents an example of the electric circuit 2 (FIG. 1), but without kick-down contact. While the terminal 11 is connected to ground potential of the vehicle, the battery voltage $U_B$ is fed at 12. The conductive-plastic potentiometer 13 is connected via the terminal 14 to a source of reference voltage. An operational amplifier 15 receives its operating voltage via a switch 16 for the voltage stabilization. Suitable components which can be used as operational amplifier 15 and voltage stabilization circuit 16 are available on the market.

The operational amplifier 15 is connected as impedance transformer by a direct coupling of its output to the inverting input. For the smallest possible loading of the conductive-plastic potentiometer 13, the operational amplifier has a small input quiescent current. Since the circuit shown in FIG. 2 is connected continuously to the battery of the automobile, an operational amplifier 15 is advantageous, the quiescent current of which is also slight.

By the selected circuit of the operational amplifier 15, the output 17 is fed a voltage which corresponds to the voltage set by the potentiometer 13 and can be fed to an electronic controller. The wiper 18 of the potentiometer 13 is mechanically connected to a switch 19 which is opened in the idle position of the gas pedal. Therefore, as soon as the gas pedal is actuated, the switch 19 closes and a voltage corresponding to the battery voltage is present at the output 20 and can then also be fed to the electronic controller.

As a modification of the circuit shown in FIG. 2, the reference voltage for the potentiometer 13 can also be obtained from the same source of voltage as the supply for the operational amplifier 15, for instance from the circuit 16. In this case, however, the operating range of the potentiometer 13 has an upper limit so that the voltage given off by the potentiometer remains below the operating voltage of the operational amplifier 15. Furthermore, a voltage-controlled source of current can be connected behind the operational amplifier 15 or the output stage of the operational amplifier be developed as source of current. In this case, no voltage proportional to the position of the wiper 18 is present at the output 17 but rather a current proportional to the position of the wiper 18 is set out via the output 17. Depending on the design of the other assemblies connected this may be advantageous.

Figure 3:
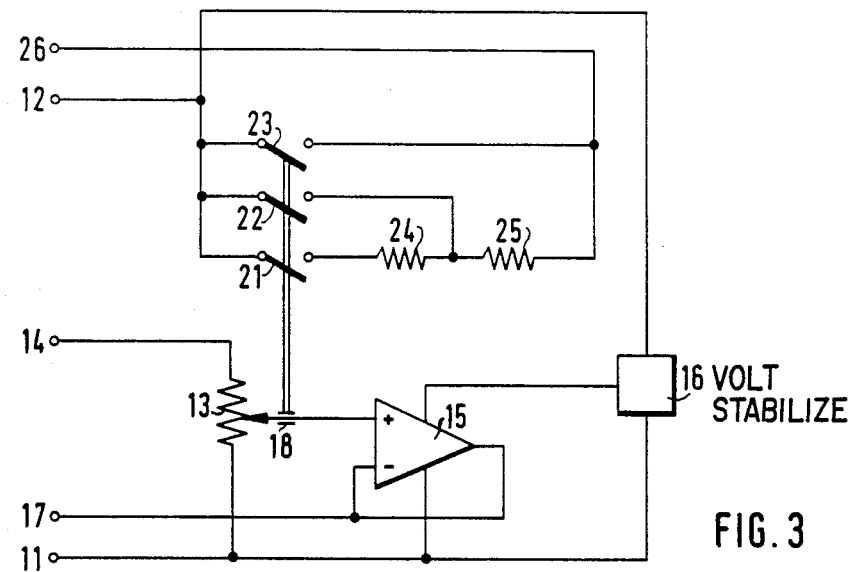

FIG. 3 shows another embodiment of the circuit 2 (FIG. 1). In this case, the potentiometer 13, the operational amplifier 15 as well as the stabilizing circuit 16 are connected in the same manner as in the case of the circuit arrangement of FIG. 2. The only difference is that instead of the switch 19 (FIG. 2), three switches 21, 22, 23 are provided which are connected to the wiper 18 of the potentiometer in such a manner that, upon movement of the wiper out of the idle position, switch 21 is first closed, followed by switch 22 and then, finally, by switch 23. Due to the fact that switch 21 is connected to the terminal 26 via two series-connected resistors 24, 25, switch 22 only over the resistor 25 and switch 23 directly, there is obtained, in cooperation with an input resistor of a circuit connected to the terminal 26, a stepwise increase in the voltage at the terminal 26 depending upon the actuating of the gas pedal.

Figure 4:
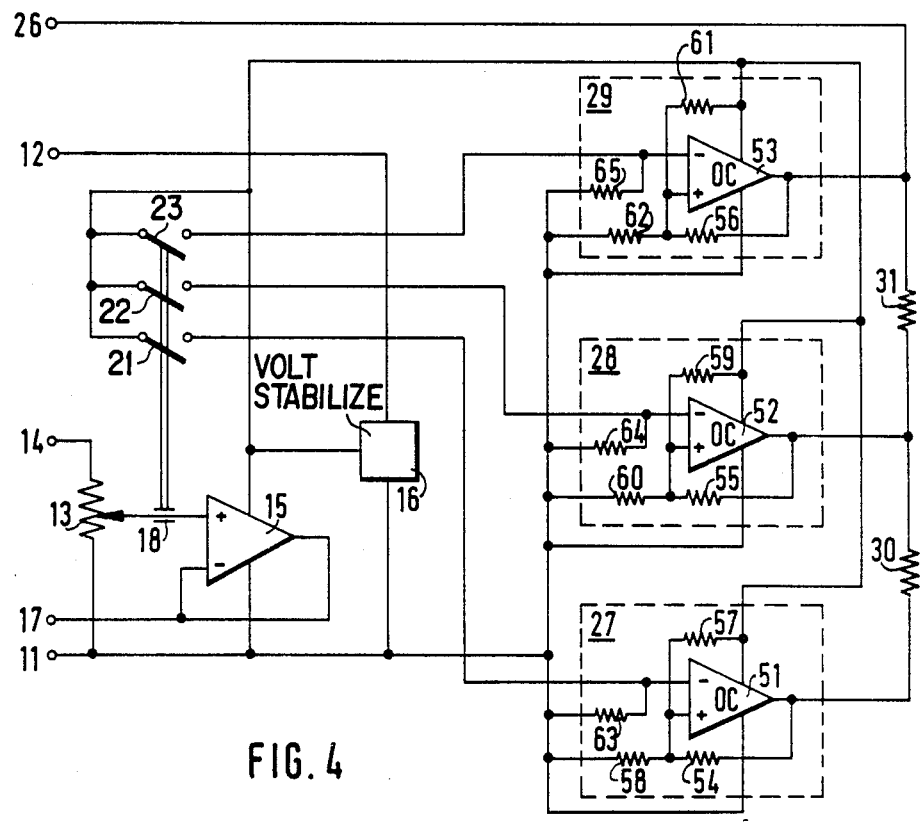

As shown in FIG. 4, the circuit of FIG. 3 can be modified so that the switches 21, 22 and 23 are connected to the output 26 via electronic threshold switches 27, 28 and 29. Resistors 30, 31 are also provided between the outputs of the threshold switches. The threshold switches are each formed by an operational amplifier 51, 52, 53 with open collector output and by a positive feedback resistor 54, 55, 56. The threshold value is determined in each case by a voltage divider 57, 58; 59, 60; 61, 62 which is connected to the non-inverting input. The inverting input is connected in each case via a resistor 63, 64, 65, to ground potential, and to one of the switches 21, 22, 23. Depending on the condition of the switches 21, 22, 23, the voltage at the inverting input is more positive or more negative than the voltage on the non-inverting input produced by the corresponding voltage divider. This circuit has the advantage over the circuit of FIG. 3 that the contacts of the switches 21, 22 and 23 are acted on by less current.

Figure 5:
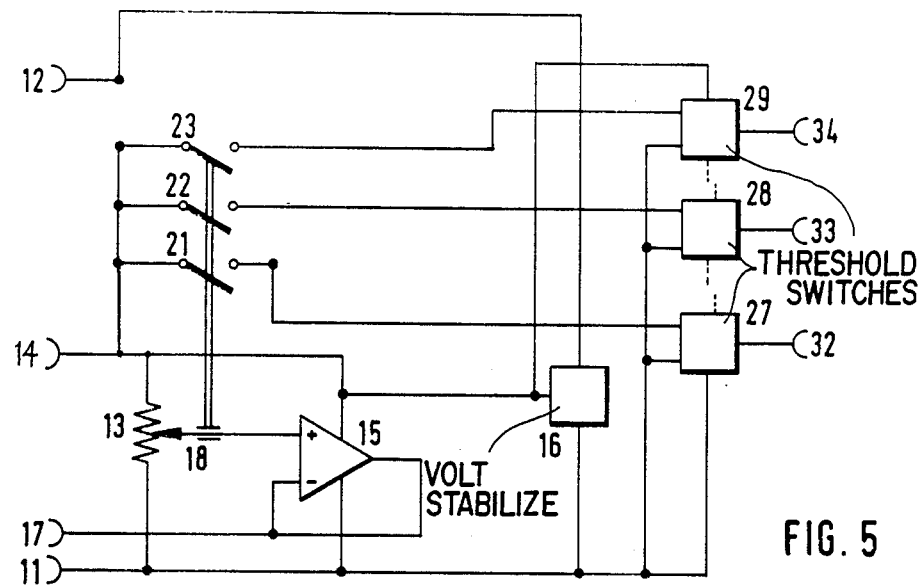

In the circuit shown in FIG. 5, threshold switches 27, 28, 29 are used as in FIG. 4. However, their outputs are connected independently of each other to terminals 32, 33, 34. At these outputs there are present switch signals each of which characterizes a gas-pedal position which is established by the coupling of the switches 21, 22, 23 to the wiper 18. In this embodiment, furthermore, as mentioned in connection with FIG. 2, the potentiometer 13 is connected to the output of the stabilization circuit 16.

Figure 6:
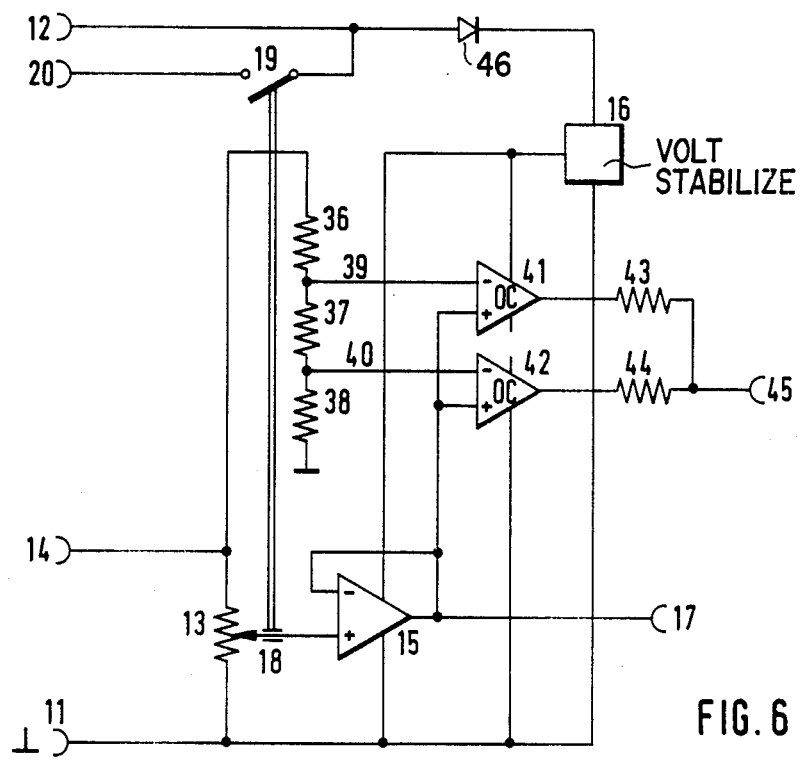

FIG. 6 shows a circuit arrangement in which the gaspedal positions at which the voltage on the terminal 45 exhibits discontinuities, are not established by mechanical means but by the effecting of measures in the electric circuit. The potentiometer 13, the operational amplifier 15 and the stabilization circuit 16 in this case connected in the same manner as in the circuit arrangement of FIG. 2.

A voltage divider which consists of three resistors 36, 37, 38 is in parallel to the potentiometer 13. Each of the taps 39, 40 of the voltage divider is connected with, respectively to one of the inputs of two operational amplifiers connected as threshold switches 41, 42. The output voltage of the operational amplifier 15 is fed to the other inputs of the threshold switches 41, 42. The outputs of the threshold switches 41 and 42 are connected via resistors 43, 44 to the terminal 45 at which there is present a signal which in each case shows a discontinuity when the voltage present on the terminal 17 exceeds a threshold determined by the resistors 36, 37 and 38.

A separate leading out (not shown) of the outputs of the threshold switches 41, 42 makes it possible to produce in each case a signal which is dependent on only one threshold. The circuit arrangement of FIG. 6 can be supplemented by increasing the number of resistors and threshold switches so that more than two switch thresholds are present.

In order to avoid damage by incorrect polarity upon the installing of the set-point transmitter in an automotive vehicle, a diode 46 is provided as protection against reverse polarity in the circuit arrangement shown in FIG. 6.

Furthermore, in the case of the circuit of FIG. 6 a switch 19 is also provided by means of which a switch signal can be given off via the output 20 independently of the circuit with the threshold switches.

We claim:

1. An electric set-point transmitter for an automotive vehicle, particularly a vehicle having a gas-pedal system, the transmitter including an actuating element comprising gas pedal means, the transmitter including also a variable resistance element which is driven by and mechanically connected to the actuating element for varying resistance in accordance with position of the gas pedal means, the transmitter producing an output electric voltage which indicates a position of the gas pedal means, the transmitter further comprising an impedance transformer having an input terminal and an output terminal, the transformer being connected at its input terminal to the resistance element for outputting at the transformer output terminal the output electric voltage which indicates the position of the gas pedal means, the transformer output terminal serving as an output of the electric set-point transmitter, said resistance element and said transformer constituting an electric circuit formed as a single structural unit; and wherein said electric circuit comprises means connected to a power supply terminal of said impedance transformer for protecting the circuit from incorrect polarity of an operating current fed to the electric circuit.

2. The transmitter as set forth in claim 1, wherein said protecting means comprises a diode connected between said power supply terminal of said impedance transformer and a source of the operating current.

3. An electric set-point transmitter for an automotive vehicle, particularly a vehicle having a gas-pedal system, the transmitter including an actuating element comprising gas pedal means, the transmitter including also a variable resistance element which is driven by and mechanically connected to the actuating element for varying resistance in accordance with position of the pas pedal means, the transmitter producing an output electric voltage which indicates a position of the gas pedal means, the transmitter further comprising an impedance transformer having an input terminal and an output terminal, the transformer being connected at its input terminal to the resistance element for outputting at the transformer output terminal the output electric voltage which indicates the position of the gas pedal means, the transformer output terminal serving as an output of the electric set-point transmitter, said resistance element and said transformer constituting an electric circuit formed as a single structural unit; and wherein said electric circuit comprises means connected serially between a source of operating voltage and said electric circuit for the stabilization of an operating voltage fed to the electric circuit.

4. An electric set-point transmitter for an automotive vehicle, particularly a vehicle having a gas-pedal system, the transmitter including an actuating element comprising gas pedal means, the transmitter including also a variable resistance element which is driven by and mechanically connected to the actuating element for varying resistance in accordance with position of the gas pedal means, the transmitter producing an output electric voltage which indicates a position of the gas pedal means, the transmitter further comprising an impedance transformer having an input terminal and an output terminal, the transformer being connected at its input terminal to the resistance element for outputting at the transformer output terminal the output electric voltage which indicates the position of the gas pedal means, the transformer output terminal serving as an output of the electric set-point transmitter, said resistance element and said transformer constituting an electric circuit formed as a single structural unit; said transmitter further comprising at least one electronic threshold switch passively coupled to said actuating element and having an output signal voltage which pass from one level into another level as the actuating element mechanically passes above and respectively below a predetermined position.

5. An electric set-point transmitter for an automotive vehicle, particularly a vehicle having a gas-pedal system, the transmitter including an actuating element comprising gas pedal means, the transmitter including also a variable resistance element which is driven by and mechanically connected to the actuating element for varying resistance in accordance with position of the gas pedal means, the transmitter producing an output electric voltage which indicates a position of the gas pedal means, the transmitter further comprising an impedance transformer having an input terminal and an output terminal, the transformer being connected at its input terminal to the resistance element for outputting at the transformer output terminal the output electric voltage which indicates the position of the gas pedal means, the transformer output terminal serving as an output of the electric set-point transmitter, said resistance element and said transformer constituting an electric circuit formed as a single structural unit; said transmitter further comprising at least one electronic threshold switch passively operatively coupled to said actuating element and providing an output signal voltage, of said output signal voltage passing from one level into another level as the actuating element passes above and respectively below a predetermined position.

6. An electric set-point transmitter for an automotive vehicle, particularly a vehicle having a gas-pedal system, the transmitter including an actuating element comprising gas pedal means, the transmitter including also a variable resistance element which is driven by and mechanically connected to the actuating element for varying resistance in accordance with position of the gas pedal means, the transmitter producing an output electric voltage which indicates a position of the gas pedal means, the transmitter further comprising an impedance transformer having an input terminal and an output terminal, the transformer being connected at its input terminal to the resistance element for outputting at the transformer output terminal the output electric voltage which indicates the position of the gas pedal means, the transformer output terminal serving as an output of the electric set-point transmitter, said resistance element and said transformer constituting an electric circuit formed as a single structural unit; and wherein said electric circuit comprises means for stabilization of an operating voltage feeding at least one impedance transformer and the threshold switch respectively, the stabilization means being serially connected between a power terminal of said electric circuit and a source of the operating voltage.

* * * * *